(12) United States Patent
Prabhala et al.

(10) Patent No.: US 10,753,301 B2
(45) Date of Patent: Aug. 25, 2020

(54) SYSTEM AND METHOD FOR OUTPUTTING FILTER MONITORING SYSTEM INFORMATION VIA TELEMATICS

(71) Applicant: Cummins Filtration IP, Inc., Columbus, IN (US)

(72) Inventors: Bharadwaj R. Prabhala, Columbus, IN (US); Abhijeet Vaidya, Columbus, IN (US); Abhijit Shimpi, Hermitage, TN (US); Amit Dhingra, McFarland, WI (US); Kyle J. Brewer, Sellersburg, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 29 days.

(21) Appl. No.: 16/091,458

(22) PCT Filed: Apr. 6, 2017

(86) PCT No.: PCT/US2017/026331
§ 371 (c)(1),
(2) Date: Oct. 4, 2018

(87) PCT Pub. No.: WO2017/176982
PCT Pub. Date: Oct. 12, 2017

(65) Prior Publication Data
US 2019/0153971 A1 May 23, 2019

Related U.S. Application Data

(60) Provisional application No. 62/320,030, filed on Apr. 8, 2016, provisional application No. 62/357,067, filed on Jun. 30, 2016.

(51) Int. Cl.
*F02D 41/22* (2006.01)
*B01D 35/143* (2006.01)
(Continued)

(52) U.S. Cl.
CPC .......... *F02D 41/22* (2013.01); *B01D 35/005* (2013.01); *B01D 35/143* (2013.01);
(Continued)

(58) Field of Classification Search
CPC ... F02D 41/22; F02D 2041/224; F02M 37/28; B01D 35/005; B01D 35/143;
(Continued)

(56) References Cited

U.S. PATENT DOCUMENTS

| 8,086,424 B2 | 12/2011 | Farmer |
| 9,104,538 B2 | 8/2015 | Garrett et al. |

(Continued)

FOREIGN PATENT DOCUMENTS

| CN | 102119116 | 7/2011 |
| CN | 104346113 | 2/2015 |

(Continued)

OTHER PUBLICATIONS

International Search Report and Written Opinion issued for PCT/US2017/026331, dated Jun. 26, 2017, 10 pages.
(Continued)

*Primary Examiner* — Mahmoud Gimie
(74) *Attorney, Agent, or Firm* — Foley & Lardner LLP

(57) ABSTRACT

A filter monitoring system and method are described. The filter monitoring system includes a module or circuit installed on an internal combustion engine or within a vehicle powered by the internal combustion engine. The filter monitoring system monitors the operation of the various filtration systems present on the engine to determine an amount of service life remaining and a loading percentage for various filter cartridges installed in the filtration systems of the internal combustion engine. The filter monitoring system determines the loading percentage and predicts remaining service life of a given filter cartridge via a (Continued)

time-based manner (e.g., based on the installation date of the filter cartridge and filter cartridge life specifications) and a pressure differential based manner (e.g., based on a determination of pressure drop across the filter cartridge).

20 Claims, 4 Drawing Sheets

(51) Int. Cl.
| | |
|---|---|
| *B01D 46/00* | (2006.01) |
| *B01D 46/42* | (2006.01) |
| *H04Q 9/00* | (2006.01) |
| *B01D 46/46* | (2006.01) |
| *B01D 37/04* | (2006.01) |
| *F02M 37/28* | (2019.01) |
| *B01D 35/00* | (2006.01) |
| *F01M 11/10* | (2006.01) |
| *F02N 11/10* | (2006.01) |

(52) U.S. Cl.
CPC ....... *B01D 37/046* (2013.01); *B01D 46/0086* (2013.01); *B01D 46/429* (2013.01); *B01D 46/46* (2013.01); *F01M 11/10* (2013.01); *F02M 37/28* (2019.01); *F02N 11/101* (2013.01); *H04Q 9/00* (2013.01); *B01D 2279/60* (2013.01); *F02D 2041/224* (2013.01); *H04Q 2209/80* (2013.01)

(58) Field of Classification Search
CPC .. B01D 37/046; B01D 37/0086; B01D 37/46; B01D 2279/60; F01M 11/10; F02N 11/101; H04Q 9/00; H04Q 2209/80
USPC ...................................................... 123/196 A
See application file for complete search history.

(56) References Cited

U.S. PATENT DOCUMENTS

| | | | |
|---|---|---|---|
| 10,382,957 B2 * | 8/2019 | Patel | C02F 1/001 |
| 2011/0238331 A1 * | 9/2011 | Moore | F02D 41/18 |
| | | | 702/47 |
| 2012/0209460 A1 * | 8/2012 | Jacques | F01M 11/10 |
| | | | 701/22 |
| 2013/0220900 A1 | 8/2013 | Milvert et al. | |
| 2016/0116392 A1 * | 4/2016 | Carpenter | B01D 35/143 |
| | | | 702/34 |
| 2016/0273471 A1 * | 9/2016 | Shimpi | B01D 35/143 |
| 2018/0202333 A1 * | 7/2018 | Sworski | G07C 5/008 |

FOREIGN PATENT DOCUMENTS

| | | |
|---|---|---|
| WO | WO 2015/057956 A1 | 4/2015 |
| WO | WO 2015/164237 | 10/2015 |

OTHER PUBLICATIONS

First Office Action issued for Chinese Patent Application No. CN 201780021790.3, dated May 7, 2020, 5 pages.

* cited by examiner

SYSTEM AND METHOD FOR OUTPUTTING FILTER MONITORING SYSTEM INFORMATION VIA TELEMATICS

CROSS-REFERENCE TO RELATED APPLICATIONS

The application is a National Stage of PCT Application No. PCT/US2017/026331, filed Apr. 6, 2017, which claims priority to and the benefit of U.S. Provisional Patent Application No. 62/320,030, filed Apr. 8, 2016, entitled "System and Method for Calculating Remaining Useful Life and Current Filter Status for Fuel and Lube Filters".

PCT Application No. PCT/US2017/026331 also claims priority to U.S. Provisional Patent Application No. 62/357,067, filed Jun. 30, 2016, entitled "System and Method for Outputting Filter Monitoring System Information via Telematics". The contents of all aforementioned applications are incorporated herein by reference in their entirety.

TECHNICAL FIELD

The present application relates to filtration systems.

BACKGROUND

Internal combustion engines generally combust a mixture of fuel (e.g., gasoline, diesel, natural gas, etc.) and air. Prior to entering the engine, fluids such as fuel, oil, and air are typically passed through filter cartridges to remove contaminants (e.g., particulates, dust, water, etc.) from the fluids prior to delivery to the engine. The filter cartridges require periodic replacement as the filter media of the filter cartridges captures and removes the contaminants from the fluids passing through the filter media. However, the lifespan and replacement times for each filter cartridge may be different. Additionally, the lifespan and replacement times for each filter cartridge may be affected by filter cartridge type, filter cartridge manufacturer, engine type, engine operating parameters, and environmental conditions.

SUMMARY

Various example embodiments relate to filtration systems and methods. One such example embodiment relates to a system. The system comprises a filter monitoring circuit, a telematics service circuit, and a data link between the filter monitoring system circuit and the telematics service circuit. The filter monitoring circuit is configured to monitor a filter cartridge of the filtration system, determine a pressure drop across the filtration system at a fluid flow rate through the fluid filtration system, determine a first value indicative of a remaining filter life of a filter cartridge of the filtration system based at least in part on the determined pressure drop, determine a second value indicative of the remaining filter life of the filter cartridge, the second value based at least in part on an amount of time the filter cartridge has been used in the filtration system, the second value determined in a different manner than the first value, compare the first value to the second value to determine which of the first value or the second value indicates a least amount of life remaining for the filter cartridge, and transmit, via the data link, an indication of the least amount of life remaining for the filter cartridge to the telematics service circuit.

Another such example embodiment relates to a method. The method includes configuring, by a filter monitoring system circuit, a data link between the filter monitoring system circuit and a telematics service system. The method includes determining, by the filter monitoring system circuit, a first value indicative of a remaining filter life of a filter cartridge of a filtration system monitored by the filter monitoring system circuit. The first value is based at least in part on a pressure drop across the filtration system at a fluid flow rate through the filtration system. The method includes determining, by the filter monitoring system circuit, a second value indicative of the remaining filter life of the filter cartridge. The second value is based at least in part on an amount of time the filter cartridge has been used in the filtration system. Additionally, the second value is determined in a different manner than the first value. The method further includes comparing, by the filter monitoring system circuit, the first value to the second value to determine which of the first value or the second value indicates a least amount of life remaining for the filter cartridge. The method includes transmitting, by the filter monitoring system circuit, an indication of the least amount of life remaining for the filter cartridge to the telematics service system.

In some embodiments, the data link may be a wireless link. In some embodiments, configuring the data link includes receiving an identification of a parameter requested by the telematics service system from a listing of a plurality of parameters relating to the filtration system that are monitored by the filter monitoring system circuit. In some embodiments, the parameter includes the amount of life remaining for the filter cartridge. Some embodiments include receiving, by the filter monitoring system circuit and from an electronic filter recognition circuit of the filtration system, an identifier associated with a radio frequency identity tag of the filter cartridge, determining, by the filter monitoring system circuit, an installation date of the filter cartridge based on receiving the identifier, and determining, by the filter monitoring system circuit, the amount of time the filter cartridge has been used in the filtration system based at least in part on the installation date. Some embodiments include determining, by the filter monitoring system circuit, a first percent loading of the filter cartridge based at least in part on the pressure drop across the filtration system at the fluid flow rate, determining, by the filter monitoring system circuit, a second percent loading of the filter cartridge based at least in part on the amount of time the filter cartridge has been used in the filtration system, the second percent loading determined in a different manner than the first percent loading, comparing, by the filter monitoring system circuit, the first percent loading to the second percent loading to determine which of the first percent loading or the second percent loading indicates a higher percent loading of the filter cartridge, and outputting, by the filter monitoring system circuit, an indication of the higher percent loading of the filter cartridge. In some embodiments, outputting the indication includes sending, by the filter monitoring system circuit, the indication to an engine control circuit of an internal combustion engine associated with the filtration system. In some embodiments, the indication causes the engine control circuit to derate the internal combustion engine or prevent the internal combustion engine from starting. In some embodiments, outputting the indication includes sending, by the filter monitoring system circuit, the indication to at least one of a display console, an operator or technician computing device, an onboard telematics device, or an external telematics service. Some embodiments include transmitting, by the filter monitoring system circuit, an indication of a fluid quality to the telematics service system. Some embodiments include transmitting, by the filter monitoring system circuit, an indication of a presence of water in fuel to the telematics service system. In some embodiments, the telematics service system comprises an onboard telematics device and a remote telematics system, the onboard telematics device communicates the indication of the least amount of life remaining for the filter cartridge to the remote telematics system.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, a filter monitoring system and a method of monitoring a filter system are described. The filter monitoring system includes a module or circuit installed on or otherwise associated with an internal combustion engine, or within a vehicle powered by the internal combustion engine. The module or circuit may be part of an engine control module that controls the operation of the internal combustion engine, or the module or circuit may be a separate from the engine control module. The filter monitoring system monitors the operation of the various filtration systems present on the engine to determine an amount of service life remaining (or used) and a loading percentage for various filter cartridges installed in the filtration systems of the internal combustion engine. The filter monitoring system determines the loading percentage and the amount of service life remaining (or used) of a given filter cartridge via both a time-based manner (e.g., based on the installation date of the filter cartridge and filter cartridge life specifications) and a pressure differential based manner (e.g., based on a determination of pressure drop across the filter cartridge). The filter monitoring system reports either the time-based values or the pressure differential based values depending on which method determines the least life remaining for loading percentage and remaining service life. Monitored filtration systems and fluids may include any of fuel-water separator filtration systems, fuel filtration systems, lube filtration systems, hydraulic fluid filtration systems, air filtration systems, crankcase ventilation breather systems, engine oil, coolant fluid, hydraulic fluid, air and any other filtration systems or fluids relating to the operation of the internal combustion engine or vehicle.

Figure 1:
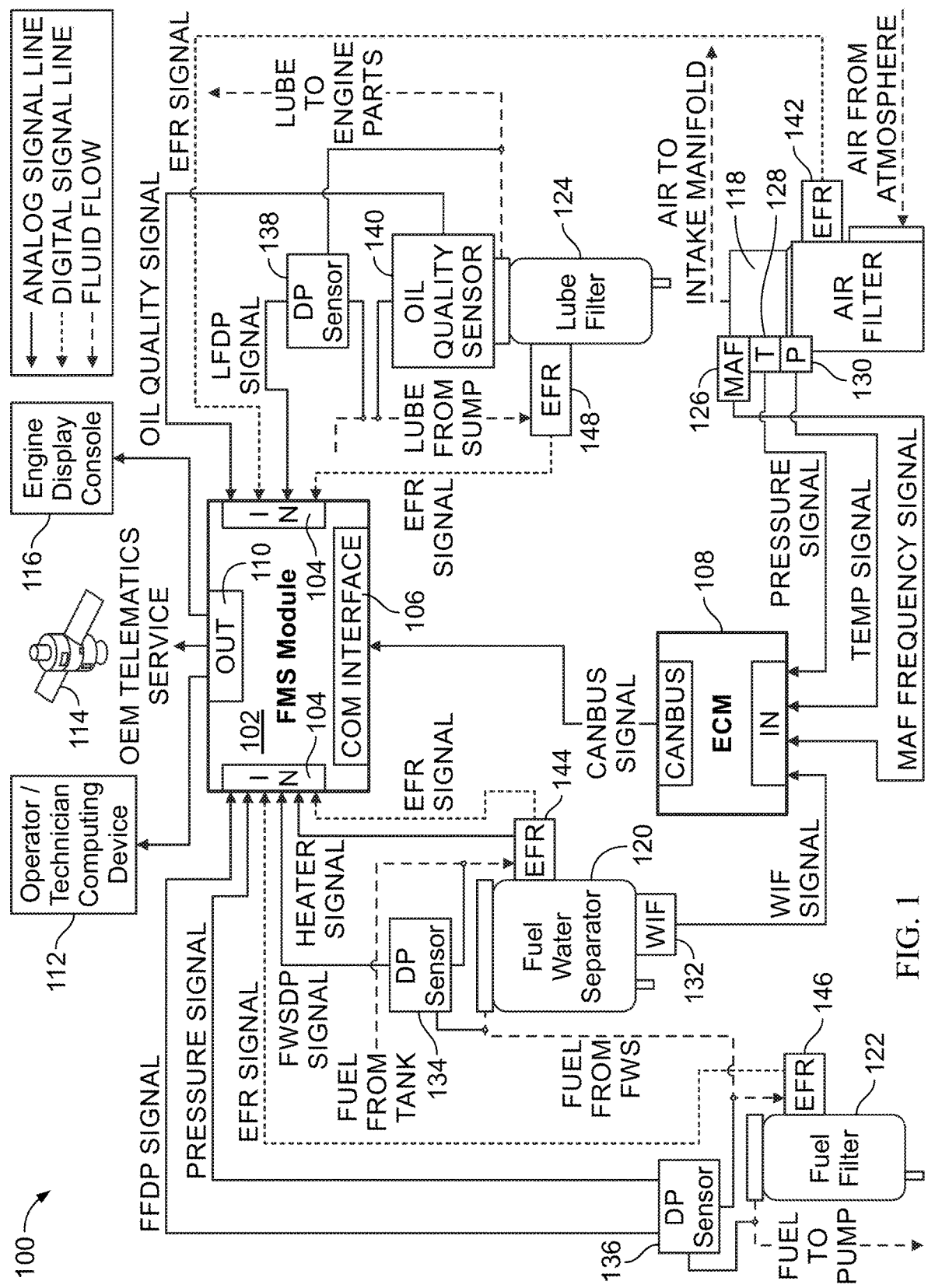
FIG. 1 shows a schematic view of a filtration monitoring system according to an example embodiment.

Referring to FIG. 1, a schematic view of a filter monitoring system 100 is shown according to an example embodiment. The filter monitoring system 100 includes a module 102. The module 102 includes a circuit having a processor (e.g., a general-purpose processor, an application specific integrated circuit (ASIC), one or more field programmable gate arrays (FPGAs), a digital signal processor (DSP), a group of processing components, or other suitable electronic processing components) and memory (e.g., RAM, NVRAM, ROM, Flash Memory, hard disk storage, etc.). The module 102 includes inputs 104 that receive feedback signals from various sensors associated with the filtration systems of the internal combustion engine. In some arrangements, the module 102 includes an analog to digital converter circuit that converts analog sensor feedback signals received via an input 104 into digital sensor feedback signals. The module 102 includes a vehicle bus communication interface 106 (also referred to as a "communication interface 106") that allows the module 102 to communicate with an engine control module 108 via a vehicle data bus (e.g., a controller area network vehicle bus ("CANBUS"), a J1939 data link, etc.). The module 102 includes an output 110. The output 110 is structured to allow the module 102 to communicate information to and from external devices (e.g., an operator or technician computing device 112, an OEM telematics service system 114, an engine display console 116, etc.) via an output 110. The output may include various communication interfaces (e.g., a J1939 datalink communication input/output, a Bluetooth transceiver, a Bluetooth low energy transceiver, a cellular data transceiver, etc.).

Generally, the module 102 is structured to monitor the filtration systems of an internal combustion engine based on sensor input, engine operating parameters, environmental parameters, vehicle location, and/or vehicle operating parameters. Specifically, the module 102 determines diagnostics and/or prognostics data for each monitored filtration system and filtration related fluids such as percent loading of a given filter element, remaining service life of a given filter element, fluid degradation information, and the like. The diagnostic and prognostic data may be J1939 output parameters, suspect parameter numbers ("SPNs"), parameter group numbers ("PGNs), etc., that are customized as necessary based on the configuration of the filter monitoring system 100. The module 102 makes the diagnostic and/or prognostic data remotely available through the output 110 (e.g., to the engine display console 116, the OEM telematics service system 114, the operator or technician computing device 112, etc.). While various circuits with particular functionality are shown in the figures, it should be understood that the module 102 may include any number of circuits for completing the functions described herein. For example, the activities of multiple circuits may be combined as a single circuit, additional circuits with additional functionality may be included, etc. Further, it should be understood that the module 102 may further control and/or monitor other internal combustion engine systems beyond the scope of the present disclosure. For example, the module 102 and the engine control module 108 may be combined as a single unit (in which case any "communication" between the module and the engine control module 108 is an internalized communication).

The engine control module 108 generally controls the operation of the internal combustion engine. In some arrangements, the engine control module 108 provides the module 102 engine characteristics (e.g., engine size, engine platform, etc.) and real-time engine operating parameters, such as engine speed (RPM), fuel type, fuel usage rate, fuel pressure, fuel pulse rate, atmosphere conditions, oil temperature, oil pressure, block temperature, torque, and the like. In some arrangements, the module 102 can send a warning message to the engine control module 108 such that the engine control module 108 triggers a dashboard light indicating to the vehicle operator that a filter cartridge needs to be changed (i.e., is approaching end of useful life). In further arrangements, the module 102 can send a derate message to the engine control module 108 such that the engine control module 108 derates an engine parameter (e.g., engine speed) in situations where a filter cartridge needs to be changed. For example, if the engine control module 108 receives the derate message, the engine control module 108 may limit operation of the internal combustion engine to a limp mode that allows the operator to drive the vehicle to a technician for filtration system servicing. In still further arrangements, the module 102 can send a no-start message to the engine control module 108 such that the engine control module 108 prevents starting of the internal combustion engine when a filter cartridge needs to be changed. In some arrangements, any derate, limp mode, or no-start commands are initiated by the OEM telematics service system 114 based on information provided to the OEM telematics service system 114 from the module 102. In such arrangements, no derate, limp mode, or no-start decisions are made at the module 102, but rather remotely via the OEM telematics service system 114.

The module 102 receives sensor feedback signals from various sensors (as described in further detail below) associated with various filtration systems, the vehicle, the internal combustion engine, the ambient environment, fluid flowing through the internal combustion engine, vehicle operating parameters, or the like. In some arrangements, the sensor feedback signals relate to a sensed characteristic of an associated filtration system. The sensors may include any of pressure sensors, pressure drop sensors, fluid characteristic sensors, moisture sensors, temperature sensors, fluid flow sensors, or the like. The sensors provide input into the module 102 such that the module 102 can determine the pressure differential across a given filtration system thereby determining the loading of the installed filter cartridge. In the particular arrangement of FIG. 1, the module 102 receives feedback from sensors associated with an air filtration system 118, a fuel-water separator filtration system 120, a fuel filtration system 122, and a lubricant filtration system 124. However, it should be understood that any combination of filtration systems may provide feedback to the module 102. For example, in some arrangements, the module 102 may receive feedback from sensors associated with a crankcase ventilation system. As described in further detail below, various sensors of the filter monitoring system 100 provide feedback signals to the module 102 and/or to the engine control module 108. In arrangements where a sensor provides the feedback signal to only the engine control module 108, the engine control module 108 can relay the feedback signal in real time to the module 102 via the communication interface 106. In some arrangements, the module 102 smoothens received sensor feedback signals prior to using the feedback signals to determine percent loading or remaining useful life of a given filter cartridge.

The air filtration system 118 includes a mass airflow sensor 126 ("MAF"), a temperature sensor 128 ("T"), and a pressure sensor 130 ("P") that each provide feedback signals to the engine control module 108. The mass airflow sensor 126 provides a feedback signal indicating the air flowrate downstream of the air filter cartridge through the air filtration system 118. The temperature sensor 128 provides a feedback signal indicating the temperature of the air flowing through the air filtration system 118. The pressure sensor 130 provides a feedback signal indicating the pressure of the air downstream of the air filter cartridge in the air filtration system 118. In an alternative arrangement, the module 102 also receives a feedback signal from a pressure differential sensor that measures the pressure drop across the air filtration system 118.

The fuel-water separator filtration system 120 includes a water-in-fuel sensor 132 ("WIF") and a pressure differential sensor 134 ("DP Sensor"). The water-in-fuel sensor 132 provides a feedback signal to the engine control module 108 indicating a water level within the fuel-water separator filtration system 120. In some arrangements, the water-in-fuel sensor 132 provides the feedback signal to the module 102 where the signal can be processed to determine the water level within the fuel-water separator filtration system 120 and/or for reporting with the other monitored parameters. The pressure differential sensor 134 provides a feedback signal to the module 102 indicating the pressure difference between fuel entering the fuel-water separator filtration system 120 from the fuel tank and fuel exiting the fuel-water separator filtration system 120. In some arrangements, the pressure differential sensor 134 also provides a separate feedback signal indicating both the inlet fuel pressure and the outlet fuel pressure separately.

The fuel filtration system 122 includes a pressure differential sensor 136 that provides a feedback signal to the module 102 indicating the pressure difference between fuel entering the fuel filtration system 122 from the fuel-water separator filtration system 120 and fuel exiting the fuel filtration system 122. In some arrangements, the pressure differential sensor 136 also provides a separate feedback signal indicating both the inlet fuel pressure and the outlet fuel pressure separately.

The lubricant filtration system 124 includes a pressure differential sensor 138 that provides a feedback signal to the module 102 indicating the pressure difference between lubricant entering the lubricant filtration system 124 (e.g., from a lubricant sump) and lubricant exiting the lubricant filtration system 124. In some arrangements, the pressure differential sensor 138 also provides a separate feedback signal indicating both the inlet lubricant pressure and the outlet lubricant pressure separately. In further arrangements, the lubricant filtration system 124 includes an oil quality sensor 140 that provides a feedback signal to the module 102 indicating a characteristic of the lubricant flowing through the lubricant filtration system 124, such as an indication of the presence of debris in the lubricant.

Still referring to FIG. 1, each of the above-described filtration systems includes an electronic filter recognition ("EFR") module. The air filtration system 118 includes an EFR module 142. The fuel-water separator filtration system 120 includes an EFR module 144. The fuel filtration system 122 includes an EFR module 146. The lubricant filtration system 124 includes an EFR module 148. Each of the EFR modules 142-148 includes a radio frequency identification ("RFID") receiver or transceiver that is structured to read data contained on an RFID tag on a filter cartridge installed in an associated filtration system and to provide the data to the module 102. In some arrangements, the data includes a serial number or unique code associated with the installed filter cartridge. In further arrangements, the data includes filter cartridge parameters (e.g., filter media type, expected life span, manufacturer identification, manufacturer specified pressure limits, etc.). Based on the data received from a given EFR module, the module 102 can determine the installation date and time of the installed filter cartridge (e.g., by recognizing when a previously unknown serial number or unique code is detected).

As described above, the module 102 can output real-time diagnostic and prognostic data to an OEM telematics service system 114. The OEM telematics service system 114 may be affiliated with the manufacturer of the internal combustion engine, the manufacturer of the filter monitoring system 100, an operator or manufacturer of the vehicle powered by the internal combustion engine, a third-party maintenance monitoring organization, or the like. In some arrangements, the real-time diagnostic and prognostic data is communicated to the OEM telematics service system 114 directly via the output 110 (e.g., via a cellular data connection between the module 102 and the OEM telematics service system 114, via an onboard component of the OEM telematics service system 114 that is located at the internal combustion engine or onboard the vehicle powered by the internal combustion engine that can communicate via a wired or wireless connection with the module 102). In such arrangements, the OEM telematics service system 114 may comprise two components: (1) an onboard component that communicates with the module 102 via the communications interface 106 and/or the output 110, and (2) a remote service that receives information from the onboard component. In other arrangements, the real-time diagnostic and prognostic data is communicated to the OEM telematics service system 114 indirectly (e.g., via the operator or technician computing device 112 transmitting the data to the OEM telematics service system 114). For example, the real-time diagnostic and prognostic data may first be communicated to a smartphone, computer, laptop, tablet, or the like that is executing a FMS application (e.g., a smartphone application), which relays the received data to the OEM telematics service system 114.

After receiving the diagnostic and prognostic data from the module 102, the OEM telematics service system 114 can analyze the received data to determine when the internal combustion engine having the various filtration systems should be serviced (e.g., when the vehicle powered by the internal combustion engine should be serviced). Accordingly, the OEM telematics service system 114 can transmit service notifications and filtration system status messages to service technicians associated with the internal combustion engine (e.g., via text message, via e-mail, via application push notifications, etc.). Additionally, the OEM telematics service system 114 can make the real-time diagnostic and prognostic data (and any related service alerts) remotely available via a customized web portal that can be accessed via remote computing devices (e.g., the operator or technician computing device 112).

Figure 2A:
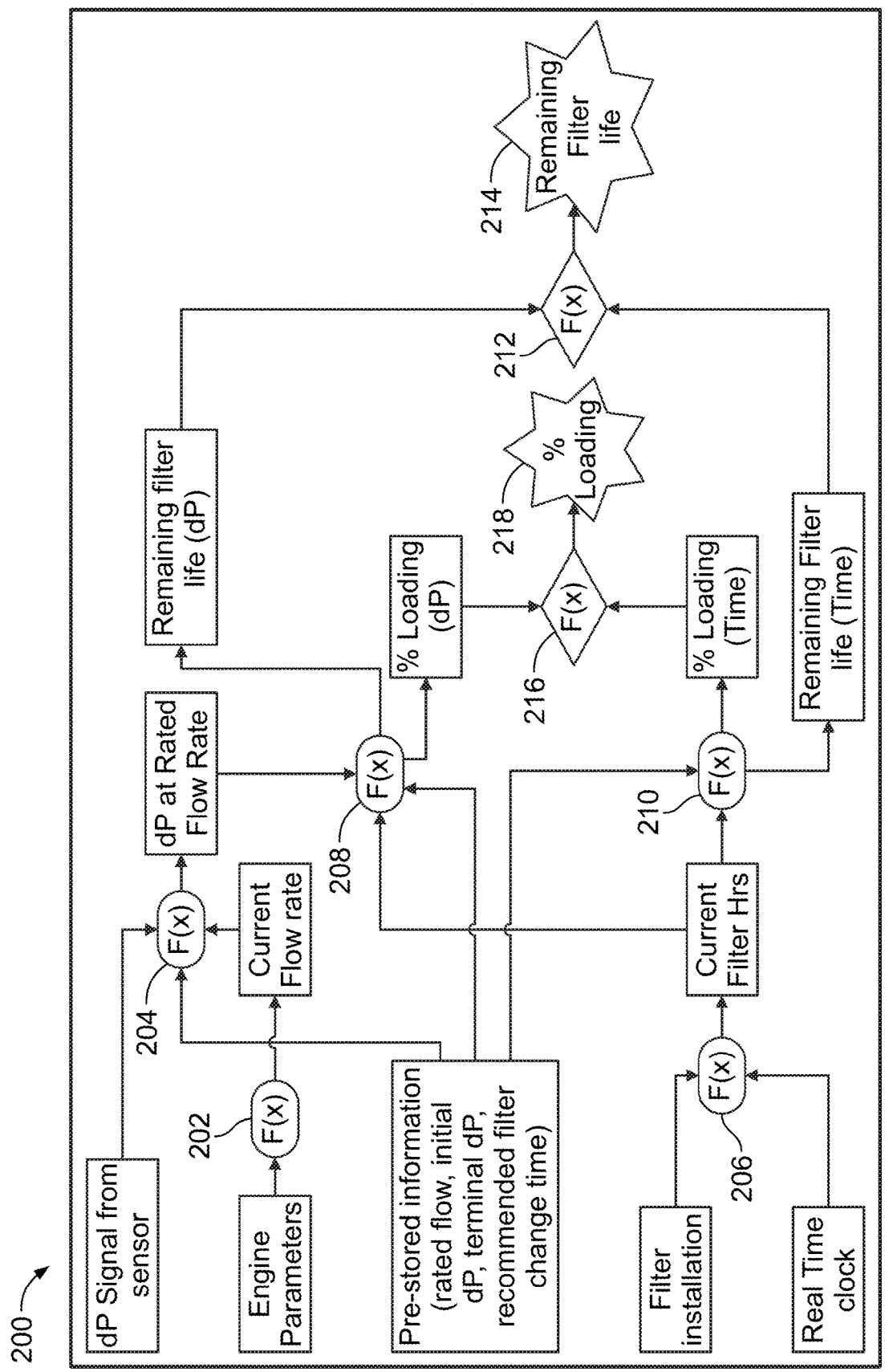
FIG. 2A shows a flow diagram of a method of monitoring a filtration system according to an example embodiment.
Figure 2B:
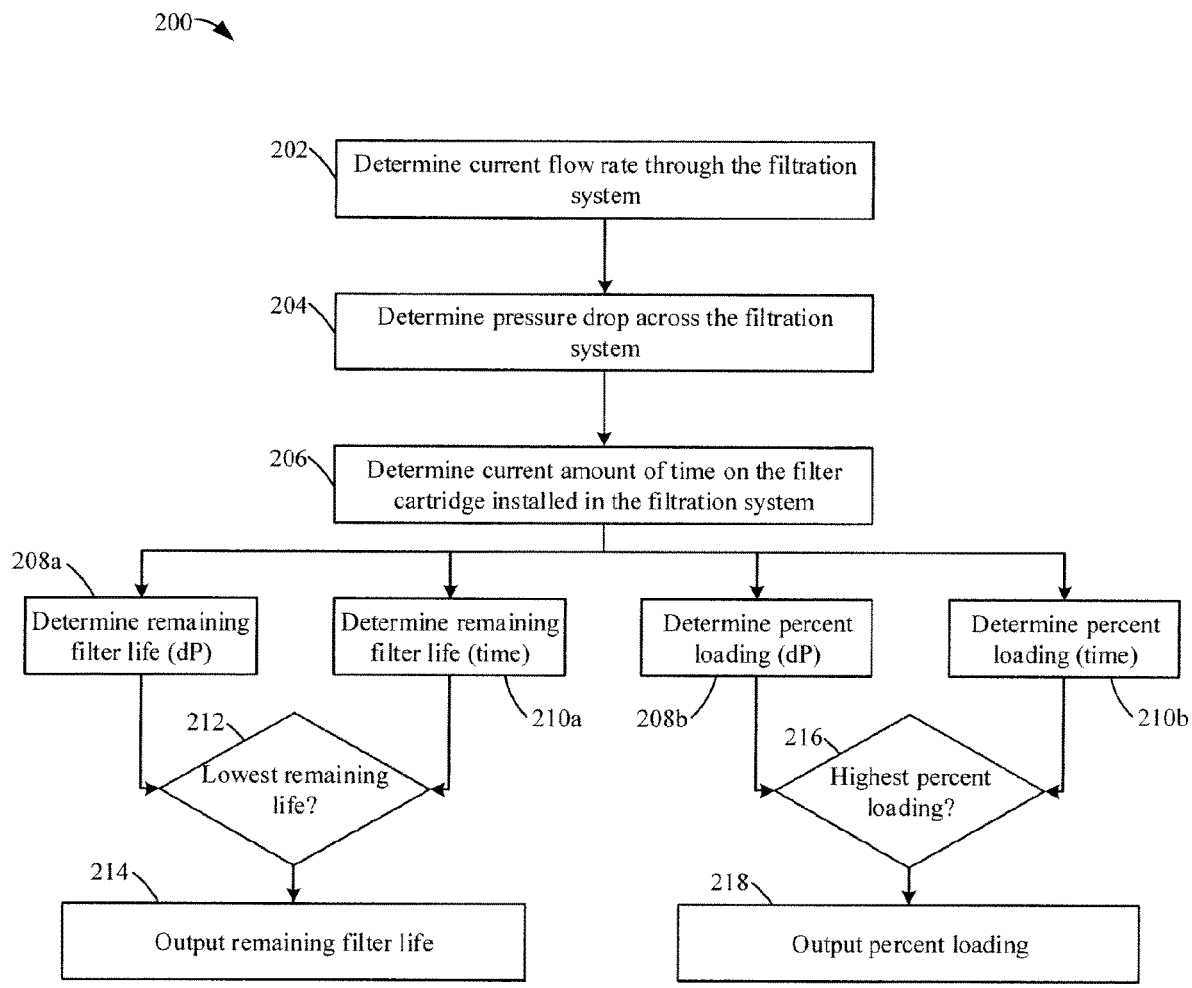
FIG. 2B shows another flow diagram of the method of monitoring a filtration system shown in FIG. 2A.

Referring to FIGS. 2A and 2B, two different flow diagrams of a method 200 of monitoring a filtration system is shown according to an example embodiment. The method 200 is performed by the module 102 of the filter monitoring system 100. During the method 200, the module 102 calculates four different values, two of which are reported: (1) the remaining filter life of a filter cartridge based on the pressure drop across the filter cartridge, (2) the remaining filter life of the filter cartridge based on an amount of time the filter cartridge has been used, (3) the percent loading of the filter cartridge based on the pressure drop across the filter cartridge, and (4) the percent loading of the filter cartridge based on the amount of time the filter cartridge has been used. Based on the calculations, the module 102 reports one of either (1) and (2) depending on which value shows the lowest amount of remaining filter life and one of either (3) and (4) depending on which value shows the highest percent loading. The method 200 is performed continuously throughout operation of the internal combustion engine and the filtration system. The following description of the method 200 is described with respect to a single filtration system (e.g., only the air filtration system 118, only the fuel filtration system 122, etc.). However, it the module 102 performs the method 200 for each of the filter cartridges in the filtration system.

The method 200 begins by determining the current flow rate of fluid through the filtration system at 202. The current flow rate of fluid through the filtration system is determined based at least in part on engine parameters. In some arrangements, the engine parameters are provided to the module 102 by the engine control module 108. The engine parameters may include any of engine speed (e.g., engine RPM), engine torque, fuel characteristics (e.g., fuel type, fuel pressure, fuel injector rail pressure, fuel pulse frequency, etc.), lubricant temperature, and/or lubricant pressure. In some arrangements, the module 102 factors in other variables into the determination besides the engine parameters, such as filter cartridge properties, fluid properties, and ambient environment properties.

After the current flow rate of fluid through the filtration is determined, the pressure drop across the filtration system at the flow rate is determined at 204. The module 102 determines the pressure drop across the filtration system. The pressure drop across the filtration system is the difference between the fluid pressure at the inlet of the filtration system and the fluid pressure at the outlet of the filtration system. The pressure drop across the filtration system is primarily attributed to the filter cartridge installed in the filtration system. As the filter cartridge traps contaminants in the fluid, the pressure drop across the filtration system increases. Accordingly, the pressure drop across the filtration system can be correlated to the remaining filter life of the installed filter cartridge and the percent loading of the filter cartridge. The module 102 determines the pressure drop across the filtration system based on the flow rate of fluid through the filtration system (as determined at 202) and a feedback signal from a pressure differential sensor (e.g., the pressure differential sensor 134) that measures the difference between the fluid pressure at the inlet of the filtration system and the fluid pressure at the outlet of the filtration system. The module 102 receives the feedback signal directly from the pressure differential sensor or indirectly via the engine control module 108 (e.g., in the case of the air filtration system 118). In some arrangements, the module 102 processes the feedback signal to remove noise caused by vibrations and pulsing of the fluid. In some arrangements, the module 102 smoothens the feedback signal to avoid huge variations of the data thereby increasing the accuracy of the filter predictions. For example, the feedback signal may be smoothened by applying a time weighted average transformation to the feedback signal or by purging certain irregular sensor feedback readings. In other arrangements, the module 102 uses adaptive numerical smoothing methods (e.g., linear or polynomial smoothing filters) to smooth the filter feedback signal. The module 102 determines the pressure drop across the filtration system at the current flow rate using a least squared method, which reduces the sensitivity of the determination to eliminate fluctuations caused by missing or errant data.

The current amount of time on the filter cartridge installed in the filtration system is determined at 206. The module 102 receives feedback from EFR module (e.g., any of EFR modules 142-148) associated with the filtration system. As described above with respect to the filter monitoring system 100, the EFR module includes an RFID receiver or transceiver that is structured to read data contained on an RFID tag on the filter cartridge installed in the filtration system and to provide the data to the module 102. The data includes at least a serial number or unique code associated with the installed filter cartridge. Based on detecting the presence of a new serial number or unique code, the module 102 can determine the installation date and time when the filter cartridge was installed in the filtration system. The module 102 then compares the installation date and time of the filter cartridge with real time clock information. In some arrangements, the real time clock information is an indication of the amount of hours the engine has been running. In these, the current amount of time on the filter cartridge is the amount of time the filter was used by the engine, which accounts for the downtime associated with engine non-use (as opposed to a total amount of time the filter has been installed in the filtration system).

After 206, all of the intermediate data is used by the module 102 to determine (1) the remaining filter life of a filter cartridge based on the pressure drop across the filter cartridge, (2) the remaining filter life of the filter cartridge based on an amount of time the filter cartridge has been used, (3) the percent loading of the filter cartridge based on the pressure drop across the filter cartridge, and (4) the percent loading of the filter cartridge based on the amount of time the filter cartridge has been used.

Still referring to FIGS. 2A and 2B, the remaining filter life based on pressure drop (208a in FIG. 2B) and the percent loading of the filter cartridge based on pressure drop (208b in FIG. 2B) are determined at 208. The module 102 uses the determined pressure drop at the fluid flow rate (determined at 204), the current amount of time on the filter cartridge (determined at 206), and pre-stored information relating to the filter cartridge to determine both the remaining filter life and the percent loading of the filter cartridge. In some arrangements, the pre-stored information relating to the filter cartridge may be transmitted to the module 102 from an RFID tag of the filter cartridge (e.g., via the EFR module of the filtration system). In determining the remaining filter life and the percent loading of the filter cartridge, the module 102 compares the determined pressure drop against the terminal pressure drop of the filter cartridge (e.g., as set by the manufacturer and as programmed in the pre-stored information relating to the filter cartridge). In some arrangements, the module 102 determines both of the remaining filter life and the percent loading of the filter cartridge via a least squared method. In other arrangements, the module 102 determines both of the remaining filter life and the percent loading of the filter cartridge via a best fit method.

The remaining filter life based on time (210a in FIG. 2B) and the percent loading of the filter cartridge based on time (210b in FIG. 2B) are determined at 210. The module 102 determines the remaining filter life and the percent loading by comparing the expected filter life time and expected filter loading pattern over time as programmed in the pre-stored information to the current amount of time on the filter cartridge (determined at 206).

The module 102 determines which remaining filter life value to output at 212. The module 102 compares the remaining filter life based on pressure drop (determined at 208/208a) with the remaining filter life based on time (determined at 210/210a). The module 102 selects the value that indicates the least amount of life remaining for the filter cartridge because the lowest value represents the most conservative estimate as to when the filter cartridge will need replacing. The selected remaining life value is output at 214. The module 102 outputs the remaining life value of the filter cartridge via the output 110 and/or via the communication interface 106.

The module 102 determines which percent loading value to output at 216. The module 102 compares the percent load based on pressure drop (determined at 208/208b) with the percent load based on time (determined at 210/210b). The module 102 selects the highest value between the two determined values because the highest value represents the most conservative estimate as to when the filter cartridge will need replacing. The selected percent loading value is output at 218. The module 102 outputs the percent loading value of the filter cartridge via the output 110 and/or via the communication interface 106.

In some arrangements, the output at either 214 or 218 is sent to a device external to the internal combustion engine. For example, the output may be sent to the operator or technician device 112 via the output 110. The operator or technician can use the information to determine whether the filter cartridge should be replaced. As another example, the output may be sent to an OEM telematics service system 114. The OEM telematics service system 114 can store the information in a database associated with the internal combustion engine. Additionally, the OEM telematics service system 114 can inform the operator of the internal combustion engine (e.g., a driver of a vehicle) that the internal combustion engine requires service when the filter cartridge needs to be replaced. As a further example, the output may be sent to the engine display console 116 to inform the operator of the internal combustion engine (e.g., a drive of a vehicle powered by the internal combustion engine) the current status of the filter cartridge and whether the filter cartridge needs to be replaced.

In further arrangements, the output at either or 214 or 218 is stored in a memory of the module 102 as an entry in a data log. The data log may be retrieved during engine service events to examine for irregularities or for identification of potential fault codes or engine operating irregularities.

In some arrangements, the output at either 214 or 218 relates to an instruction sent to the engine control module 108 via the communication interface 106. For example, the module 102 can send a derate message to the engine control module 108 such that the engine control module 108 derates an engine parameter (e.g., engine speed) in situations where a filter cartridge needs to be changed. If the engine control module 108 receives the derate message, the engine control module 108 may limit operation of the internal combustion engine to a limp mode that allows the operator to drive the vehicle to a technician for filtration system servicing. As another example, the module 102 can send a no-start message to the engine control module 108 such that the engine control module 108 prevents starting of the internal combustion engine when a filter cartridge needs to be changed.

Figure 3:
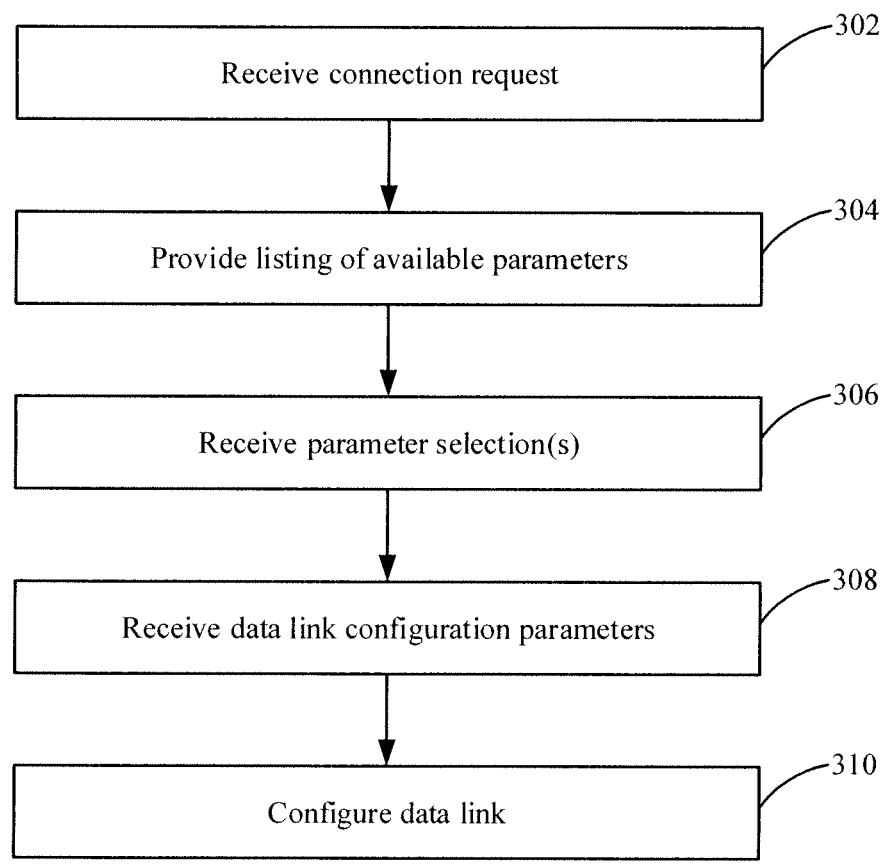
FIG. 3 shows a flow diagram of a method of configuring a filtration monitoring system to communicate with a remote telematics system according to an example embodiment.

Referring to FIG. 3, a flow diagram of a method 300 of configuring the filter monitoring system 100 to communicate with the OEM telematics service system 114 is shown according to an example embodiment. The method 300 begins when a connection request is received at 302. The connection request is received by the module 102. For example, the connection request may be received from an operator or technician computing device 112 used by an operator or technician to program the module 102 to communicate with the OEM telematics service system 114 via the communication interface 106. In some arrangements, the operator or technician computing device 112 is running configuration software that enables the operator or technician computing device 112 to program the module 102 to communicate with the EOM telematics service system 114.

A listing of available monitored parameters are provided at 304. The module 102 transmits a listing of available monitored parameters (e.g., any of the above-described sensor feedback signals associated with any monitored filtration system of the internal combustion engine, filter cartridge remaining life calculations, engine operating parameters, environmental conditions, vehicle location information, etc.). In some arrangements, the listing includes J1939 parameters that are monitored through module 102 (e.g., SPNs, PGNs, specifications, engine operating parameters, etc.). A parameter selection is received at 306. The module 102 receives the parameter selection from the operator or technician computing device 112. The parameter selection includes a customized list of monitored parameters that are to be provided to the remote OEM telematics service system 114.

Data link configuration parameters are received at 308. The configuration parameters define how the module 102 communicates with the OEM telematics service system 114. For example, the configuration parameters can define the settings for a wireless (e.g., Bluetooth, cellular, etc.) pairing between the OEM telematics service system 114 and the module 102. The pairing may occur via the Internet. The module 102 receives the configuration parameters from the operator or technician computing device 112. The data link between the module 102 and the OEM telematics service system 114 is configured at 310.

After the data link is configured, the module 102 can report the selected monitored system parameters to the OEM telematics service system 114 via the data link. Accordingly, the module 102 can transmit any of the monitored filtration system information, internal combustion engine information, vehicle location information to the OEM telematics service system 114 based on the configuration settings (i.e., what information the OEM telematics service system 114 requested to receive). For example, the module 102 can transmit information relating to the remaining filter life of each filter cartridge, water level information concerning a fuel-water separator, information relating to the next anticipated service intervals for the vehicle, the location of the vehicle, the locations of service centers near the vehicle location, and the like.

In order to properly receive and present the received data from the module 102, the OEM telematics service system 114 may require additional configuration. For example, the OEM telematics service system 114 may require front end and web portal service provider software updates to be able to analyze and display the data (e.g., any of the J1939 parameters described above) received from the module 102. Further, the OEM telematics service system 114 may enter into data share agreements between the telematics provider and a front end web portal service provider to facilitate receiving the data feed from the module via a cloud or remote server. Based on the front end web portal chosen by the operator of the OEM telematics service system 114, service managers may be provided access to the web portal and receive automated service notifications for fleet vehicles having the filter monitoring system 100 installed. Implementation procedure can be customized based on the end user, customer, telematics system, and front end portal chosen for accessing information.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Some of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the processor of the module 102 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on a computer (such as via the module 102 of FIG. 1), partly on the computer, as a stand-alone computer-readable package, partly on the computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A monitoring system for a filtration system comprising:
a filter monitoring system circuit;
a telematics service circuit;
an engine control circuit of an internal combustion engine associated with the filtration system;
a first data link between the filter monitoring system circuit and the telematics service circuit; and
a second data link between the filter monitoring system circuit and the engine control circuit;
wherein the filter monitoring system circuit is configured to:
monitor a filter cartridge of the filtration system,
determine a pressure drop across the filtration system at a fluid flow rate through the fluid filtration system,
determine a first value indicative of a remaining filter life of a filter cartridge of the filtration system based at least in part on the determined pressure drop,
determine a second value indicative of the remaining filter life of the filter cartridge, the second value based at least in part on an amount of time the filter cartridge has been used in the filtration system, the second value determined in a different manner than the first value,
compare the first value to the second value to determine which of the first value or the second value indicates a least amount of life remaining for the filter cartridge, and
transmit, via the first data link, an indication of the least amount of life remaining for the filter cartridge to the telematics service circuit based on the comparison.

2. The system of claim 1, wherein the first data link is a wireless data link.

3. The system of claim 1, wherein the filter monitoring system circuit is further configured to receive, an identification of a parameter requested by the telematics service system from a listing of a plurality of parameters relating to the filtration system that are monitored by the filter monitoring system circuit.

4. The system of claim 3, wherein the parameter is associated with an amount of life remaining for the filter cartridge.

5. The system of claim 1, further comprising:
an electronic filter recognition circuit, wherein the filtration system comprises the electronic filter recognition circuit, and
wherein the filter monitoring system circuit is further configured to:

receive, from the electronic filter recognition circuit, an identifier associated with a radio frequency identity tag of the filter cartridge, determine an installation date of the filter cartridge based on receiving the identifier, and determine the amount of time the filter cartridge has been used in the filtration system based at least in part on the installation date.

6. The system of claim 1, wherein the filter monitoring circuit is further configured to:

determine a first percent loading of the filter cartridge based at least in part on the determined pressure drop, determine a second percent loading of the filter cartridge based at least in part on the amount of time the filter cartridge has been used in the filtration system, the second percent loading determined in a different manner than the first percent loading, compare the first percent loading to the second percent loading to determine which of the first percent loading or the second percent loading indicates a higher percent loading of the filter cartridge, and output an indication of the higher percent loading of the filter cartridge.

7. The system of claim 1, wherein the filter monitoring circuit is further configured to transmit a second indication, via the second data link, to the engine control circuit of the internal combustion engine associated with the filtration system based on the comparison.

8. The system of claim 7, wherein the transmitted second indication causes the engine control circuit to derate the internal combustion engine or prevent the internal combustion engine from starting.

9. A method comprising:

configuring, by a filter monitoring system circuit, a first data link between the filter monitoring system circuit and a telematics service system;

configuring, by the filter monitoring system circuit, a second data link between the filter monitoring system circuit and an engine control circuit of an internal combustion engine;

determining, by the filter monitoring system circuit, a first value indicative of a remaining filter life of a filter cartridge of a filtration system monitored by the filter monitoring system circuit, the first value based at least in part on a pressure drop across the filtration system at a fluid flow rate through the filtration system;

determining, by the filter monitoring system circuit, a second value indicative of the remaining filter life of the filter cartridge, the second value based at least in part on an amount of time the filter cartridge has been used in the filtration system, the second value determined in a different manner than the first value;

comparing, by the filter monitoring system circuit, the first value to the second value to determine which of the first value or the second value indicates a least amount of life remaining for the filter cartridge; and transmitting, by the filter monitoring system circuit, an indication of the least amount of life remaining for the filter cartridge to the telematics service system based on the comparison.

10. The method of claim 9, wherein the first data link is a wireless data link.

11. The method of claim 9, wherein configuring the data link includes receiving, by the filter monitoring system circuit, an identification of a parameter requested by the telematics service system from a listing of a plurality of parameters relating to the filtration system that are monitored by the filter monitoring system circuit.

12. The method of claim 11, wherein the parameter includes the amount of life remaining for the filter cartridge.

13. The method of claim 9, further comprising:

receiving, by the filter monitoring system circuit and from an electronic filter recognition circuit of the filtration system, an identifier associated with a radio frequency identity tag of the filter cartridge;

determining, by the filter monitoring system circuit, an installation date of the filter cartridge based on receiving the identifier; and determining, by the filter monitoring system circuit, the amount of time the filter cartridge has been used in the filtration system based at least in part on the installation date.

14. The method of claim 9, further comprising:

determining, by the filter monitoring system circuit, a first percent loading of the filter cartridge based at least in part on the pressure drop across the filtration system at the fluid flow rate;

determining, by the filter monitoring system circuit, a second percent loading of the filter cartridge based at least in part on the amount of time the filter cartridge has been used in the filtration system, the second percent loading determined in a different manner than the first percent loading;

comparing, by the filter monitoring system circuit, the first percent loading to the second percent loading to determine which of the first percent loading or the second percent loading indicates a higher percent loading of the filter cartridge; and outputting, by the filter monitoring system circuit, an indication of the higher percent loading of the filter cartridge.

15. The method of claim 9, further comprising transmitting, by the filter monitoring system circuit, a second indication, via the second data link, to the engine control circuit of the internal combustion engine associated with the filtration system based on the comparison.

16. The method of claim 15, wherein the second indication causes the engine control circuit to derate the internal combustion engine or prevent the internal combustion engine from starting.

17. The method of claim 9, wherein outputting the indication includes sending, by the filter monitoring system circuit, the indication to at least one of a display console, an operator or technician computing device, an onboard telematics device, or an external telematics service.

18. The method of claim 9, further comprising transmitting, by the filter monitoring system circuit, an indication of a fluid quality to the telematics service system.

19. The method of claim 9, further comprising transmitting, by the filter monitoring system circuit, an indication of a presence of water in fuel to the telematics service system.

20. The method of claim 9, wherein the telematics service system comprises an onboard telematics device and a remote telematics system, the onboard telematics device communicates the indication of the least amount of life remaining for the filter cartridge to the remote telematics system.

* * * * *